(12) United States Patent
Kuku et al.

(10) Patent No.: US 9,833,739 B1
(45) Date of Patent: Dec. 5, 2017

(54) EXHAUST GAS CLEAN-UP SYSTEM FOR FOSSIL FUEL FIRED POWER PLANT

(71) Applicants: Lai O. Kuku, Gilbert, AZ (US); Melvin Mathew, Tempe, AZ (US); Michael P. Woudenberg, Phoenix, AZ (US)

(72) Inventors: Lai O. Kuku, Gilbert, AZ (US); Melvin Mathew, Tempe, AZ (US); Michael P. Woudenberg, Phoenix, AZ (US)

(73) Assignee: MILLENIUM SYNTHFUELS CORPORATION, Gilbert, AZ (US)

( * ) Notice: Subject to any disclaimer, the term of this patent is extended or adjusted under 35 U.S.C. 154(b) by 0 days.

(21) Appl. No.: 15/401,838

(22) Filed: Jan. 9, 2017

Related U.S. Application Data

(63) Continuation-in-part of application No. 15/227,860, filed on Aug. 3, 2016.

(51) Int. Cl.

| | |
|---|---|
| *B01D 53/14* | (2006.01) |
| *B01D 53/75* | (2006.01) |
| *B04C 9/00* | (2006.01) |
| *B01D 39/20* | (2006.01) |
| *B01D 46/00* | (2006.01) |
| *B01D 45/12* | (2006.01) |
| *B01D 53/64* | (2006.01) |
| *B01D 53/80* | (2006.01) |
| *B01D 53/48* | (2006.01) |
| *B01D 53/86* | (2006.01) |
| *F23J 15/02* | (2006.01) |

(52) U.S. Cl.
CPC ......... *B01D 53/75* (2013.01); *B01D 39/2055* (2013.01); *B01D 45/12* (2013.01); *B01D 46/0036* (2013.01); *B01D 53/48* (2013.01); *B01D 53/64* (2013.01); *B01D 53/80* (2013.01); *B01D 53/864* (2013.01); *B01D 53/8631* (2013.01); *B04C 9/00* (2013.01); *F23J 15/02* (2013.01); *B01D 2255/1021* (2013.01); *B04C 2009/002* (2013.01)

(58) Field of Classification Search
USPC ....... 422/168–172; 423/243.01, 242; 60/295, 60/60; 95/273
See application file for complete search history.

(56) References Cited

U.S. PATENT DOCUMENTS

| | | | | |
|---|---|---|---|---|
| 4,625,661 A | * | 12/1986 | Melchior | F23G 5/0273 110/215 |
| 5,630,991 A | * | 5/1997 | Gal | B01D 53/501 423/243.01 |
| 6,299,848 B1 | * | 10/2001 | Teller | B01D 53/501 423/242.1 |
| 8,124,036 B1 | * | 2/2012 | Baldrey | C01G 13/04 423/107 |

(Continued)

*Primary Examiner* — Nina Bhat

(57) ABSTRACT

A fossil fuel fired power plant exhaust gas clean-up system is provided to remove detrimental compounds/elements from the exhaust gas emitting from the power plant to protect the environment. This is accomplished primarily by directing the exhaust gas from a fossil fuel fired power plant through both a reaction chamber containing a chemically produced compound and a catalytic converter. The final exhaust gas can now be safely exhausted to the atmosphere and only contains nitrogen gas, oxygen, water and a trace amount of carbon dioxide.

8 Claims, 4 Drawing Sheets

(56) References Cited

U.S. PATENT DOCUMENTS

| | | | | |
|---|---|---|---|---|
| 8,168,147 B2* | 5/2012 | Olson | ................... | B01D 53/10 |
| | | | | 423/103 |
| 8,496,894 B2* | 7/2013 | Durham | ................ | B01D 46/00 |
| | | | | 423/210 |
| 8,883,099 B2* | 11/2014 | Sjostrom | ................ | B01D 53/64 |
| | | | | 210/198.1 |
| 8,974,756 B2* | 3/2015 | Martin | ................ | B01D 53/685 |
| | | | | 422/168 |
| 2012/0031081 A1* | 2/2012 | Mullinix | .................. | F01N 1/18 |
| | | | | 60/295 |

* cited by examiner

EXHAUST GAS CLEAN-UP SYSTEM FOR FOSSIL FUEL FIRED POWER PLANT

TECHNICAL FIELD

The subject design relates generally to an exhaust gas clean-up system that helps to remove some detrimental exhaust gas compositions and more specifically relates to a process and apparatus that processes exhaust gas from a fossil fuel fired power plant to remove detrimental exhaust gas compositions.

BACKGROUND

There have been many different arrangements that attempt to remove detrimental flue gas compositions but most of them are only partially effective in removing most if not al the detrimental exhaust gas compositions. Many times, this is based on the extreme cost of effective types of exhaust gas removal systems. Emissions of nitrogen oxides into the atmosphere can result in the generation of ozone in our atmosphere. Ozone is important in our higher altitudes since it helps to offset the effects of the sun's damaging rays on the earth. However, ozone can be a hazard to humans when it is within our habitable altitude. Another emitted gas that is detrimental is sulfur dioxide. It reacts with atmospheric water and causes acid rain. Likewise, carbon dioxide creates major environmental issues when exhausted into the atmosphere and is the main cause of global warming and climate change. U.S. Pat. No. 4,625,661 which issued on Dec. 2, 1986 to August S. Melchior teaches the use of boiling chambers followed by individual catalytic converters to vaporize small amount of hazardous waste materials. There is not teaching or suggestion of using a reaction chamber having an added reacting compound therein to remove various detrimental compounds. U.S. Pat. No. 5,630,991 which issued on May 20, 1997 to Eli Gal et al teaches a process for dissolving limestone by adding ammonium ions to the process. Eli Gal et al is using ammonium ions to aid in breaking down the limestone to a more finite size and does not teach the use of adding a reacting compound to a reaction chamber to cause a chemical reaction to reduce detrimental elements in the exhaust gas. The adding of calcium hydroxide to the slurry of Eli Gal et al is done merely to raise the pH level therein. Other publications, such as: U.S. Pat. Nos. 5,362,468; 7,065,962; 5,034,204; and US Publication 2008/0233025 each teach systems for addressing removal of certain gases from an exhaust gas. Other detrimental gases or compounds include 'fly ash', mercury and mercuric salts. These detrimental gases or compounds are primarily introduced into the exhaust gases of coal-fired power plants. However, the same detrimental gases or compounds could be introduced from other types of power plants. There have been various types of 'fly ash' removals. For example, 'bag houses' have been extensively used to separate and remove 'fly ash' from the exhaust gases. These 'bag houses' require large amounts of floor space and also require large amounts of maintenance. It is known that 'fly ash' has an initial surface-absorbent for the mercury vapors and its mercuric salts. Consequently, removal of the 'fly ash' serves to remove portions of the mercury and mercuric salts. However, reduced amounts of the mercury and mercuric salts pass through with the other exhaust gases. It is desirable to more efficiently remove the 'fly ash' from the power plant exhaust gases and to remove all or practically all the mercury and mercuric salts from the exhaust gases. It is also known to use activated carbon filters to help remove mercury and mercuric salts. However, the activated carbon filters are still limited in that they can normally only remove about 50-75 percent of the mercury and mercuric salts from the exhaust gases. Therefore, it is desirable to provide a system that can substantially remove all the remaining mercury and mercuric salts from the exhaust gases. U.S. Pat. No. 4,691,034 teaches that it is known to use glycerol or other solubilizers in calcium hydroxide to enhance solubility. The above noted patent teaches using glycerol with calcium hydroxide to remove methyl format and aldehydes without loss of propylene oxide. Application WO 2002069708 A1, now abandoned, teaches the use of glycerol as an active substance in combination with other elements for use as a fungicide. US 2014/0106008 A1 teaches the use of glycerol mixture and calcium hydroxide in water to enhance the solubility of the calcium hydroxide by a factor of 1.5 times to prevent or reduce the production of contaminants selected from microorganisms and microorganism-produced toxins. None of the above noted publication teaches singularly or in combination the subject matter claimed herein. The subject design serves as a possible solution to at least the above noted detrimental exhaust gases.

SUMMARY OF THE INVENTION

According to the present design, an exhaust gas clean-up system is provided that is effective to remove 'fly ash', mercury and mercuric salts from a fossil fuel fired power plant prior to the exhaust gas entering the atmosphere. By adding a cyclone gas separator and an activated carbon filter downstream of the fossil fuel fired power plant, substantially all the 'fly ash' is removed and the mercury and mercuric salts are reduced by about 75 percent. To further aid in substantially eliminating the mercury and mercuric salts, a solubilizer, such as, for example, glycerol is added to the calcium hydroxide supply to enhance its solubility. Consequently, once the glycerol/calcium hydroxide solution interacts with the exhaust gases within the reaction chamber, the mercury and mercuric salts are substantially eliminated.

The sequence of the various steps and the interaction therebetween permits the production of various byproducts, and which in some instances permit the use of the byproducts in the chemical reaction of compounds in other parts of the process.

Other objects, features, and advantages of the subject design will become more apparent from the following detailed description of the following embodiment and certain modification thereof when taken together with the accompanying drawing.

DETAILED DESCRIPTION

Figure 1:
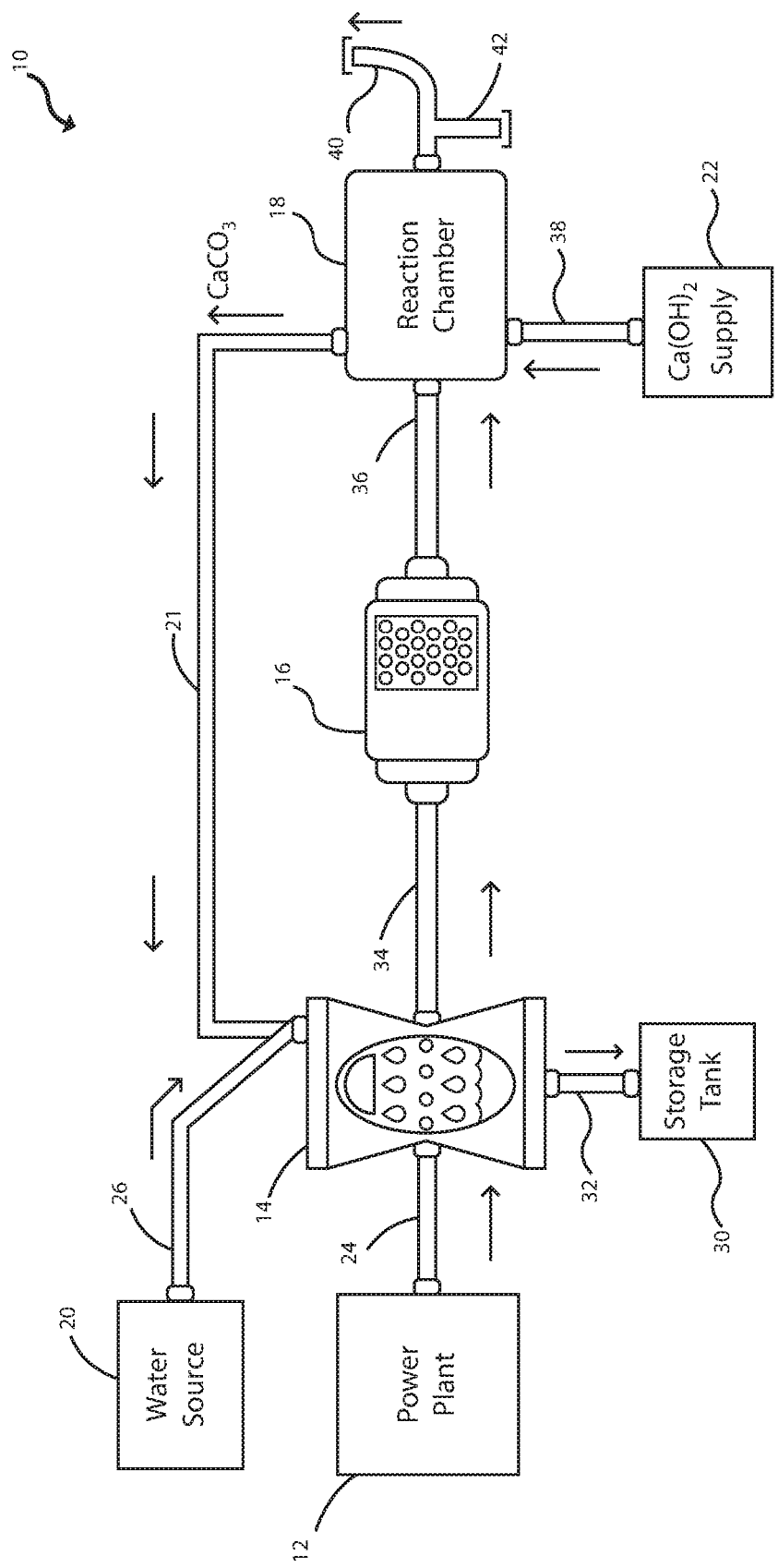
FIG. 1 is a partial flow chart and a partial diagrammatic representation of one embodiment of the subject design.

Referring to FIG. 1 of the drawings, an exhaust gas clean-up system 10 is provided. The exhaust gas clean-up system 10 is connected to the exhaust of a typical fossil fuel fired power plant 12. The exhaust gas from the fossil fuel fired power plant 12 contains various percentages of water (H₂O), nitrogen (N), sulfur dioxide (SO₂), carbon dioxide (CO₂), and nitrogen oxides (NO$_x$). There could be minimal amounts of carbon monoxide (CO) depending on the purity of the fossil fuel being used. The gas clean-up system 10 includes a wet scrubber 14, a catalytic converter 16, a reaction chamber 18, a source of water 20, a source of a chemically produced compound connecting line 21, and a source of reacting compound 22.

The wet scrubber is connected to the exhaust of the power plant 12 by an exhaust gas connection line 24 and to the source of water 20 by a water connection line 26. The source 22 of the chemically produced compound is, in the subject arrangement, the reacting chamber 18 and is connected to the wet scrubber by a compound connection line 21. The chemical reaction within the wet scrubber 14 produces a usable by-product and acts to remove the sulfur by the chemical reaction between the sulfur dioxide in the exhaust gas, the slurry of water and calcium carbonate as seen below:

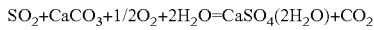

$$SO_2+CaCO_3+1/2O_2+2H_2O=CaSO_4(2H_2O)+CO_2$$

This reaction consumes calcium carbonate, water, and oxygen in order to convert sulfur dioxide into $CaSO_4(2H_2O)$ which can be utilized in various ways as gypsum. The by-product of gypsum is directed to a holding tank 30 by a bypass line 32. This reaction cleans up the sulfur dioxide that is contained in the exhaust gas.

The chemically modified exhaust gas is now directed to the catalytic converter 16 by the converter connecting line 34 further chemically modifying the exhaust gas. The catalytic converter 16 can be a typical catalytic converter used in most automobiles. However, a platinum converter with an internal honeycomb arrangement is more effective even though the use of the platinum converter does not depart from the essence of the subject invention. Even though the catalytic converter 16 is shown upstream of the reaction chamber 18, it is recognized that it could be located downstream of the reaction chamber 18 without departing from the essence of the subject arrangement. The catalytic converter would still function as described hereinafter.

Within the subject catalytic converter 16, the nitrogen oxides are converted into nitrogen (N) and oxygen (O₂). The residual carbon monoxide (CO) may converted into carbon dioxide (CO₂) and water (H₂O). The major difference between the use of fossil fuel, as used herein, and gas fuel as used in automobiles is that the burning of fossil fuel does not produce hydrocarbons like the burning of gasoline in automobiles. The burning of gasoline is responsible for the production of large amounts of carbon monoxide (CO) which usually are not present in fossil fuels. Even though catalytic converters are used in automobiles to reduce and/or remove carbon monoxide and hydrocarbons, these gasses are not present in the subject exhaust gas. If they happen to be present, they will only be in minimal amounts. At this point within the design, the nitrogen oxides (NO$_x$) and the sulfur oxides (SO₂) have been addressed and that which is left is nitrogen gas (N), water (H₂O), carbon dioxide (CO₂), and oxygen (O₂).

In order to eliminate carbon dioxide (CO₂) emissions as well as provide the wet scrubber 14 with the chemically produced compound, i.e. calcium carbonate (CaCO₃) and water, the further chemically modified exhaust gas is passed to the reaction chamber 18 through a reacting connection line 36. The source of reacting compound, i.e. calcium hydroxide (Ca(OH)₂, is introduced in the reaction chamber 18 through a reacting compound line 38.

The chemical reaction within the reaction chamber is as follows:

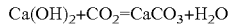

$$Ca(OH)_2+CO_2=CaCO_3+H_2O$$

The calcium carbonate (CaCO₃) and water are directed from the reaction chamber 18 to the wet scrubber 14 as the source of chemically produced compound and to add water thereto also. The source of chemically produced compound and water from the reaction chamber 18 are returned through the source of compound connecting line 21. The volume of calcium carbonate and water being bypassed from the reaction chamber 18 to the wet scrubber 14 through the source of compound connecting line 21 will normally be sufficient to continue the operating process without the need of the water source 20.

At this point in the process, the final chemically modified exhaust gas can be safely emitted into the atmosphere through an exhaust line 40. Any water that is passing through the exhaust line 40 can be bypassed to a water tank 42.

Figure 2:
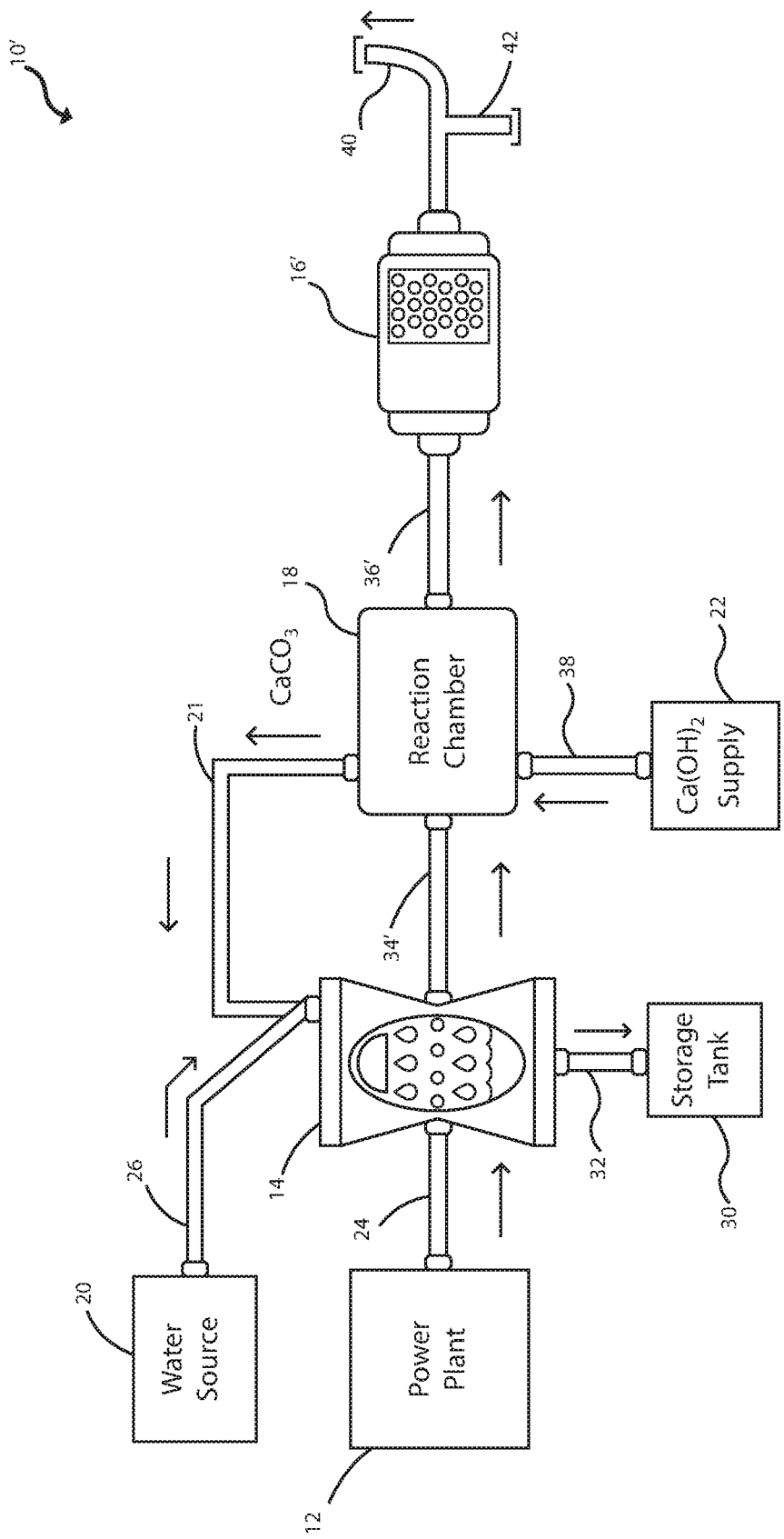
FIG. 2 is a partial flow chart and a partial diagrammatic representation of another embodiment of the subject design.

Referring to the embodiment of FIG. 2, like elements have like element numbers and moved/modified elements has like element numbers with a 'prime' symbol attached thereto.

In the embodiment of FIG. 2, the catalytic converter 16 of FIG. 1 has been moved from a location upstream of the reaction chamber 18 to a location downstream thereof between the downstream side of the reaction chamber 18 and the atmosphere. All aspects from the embodiment of FIG. 2 function in the same manner as that of FIG. 1. Since the reaction chamber 18 serves to eliminate carbon dioxide present and the catalytic converter eliminates nitrogen oxides, the exhaust gas is now safe to vent it to the atmosphere.

Figure 3:
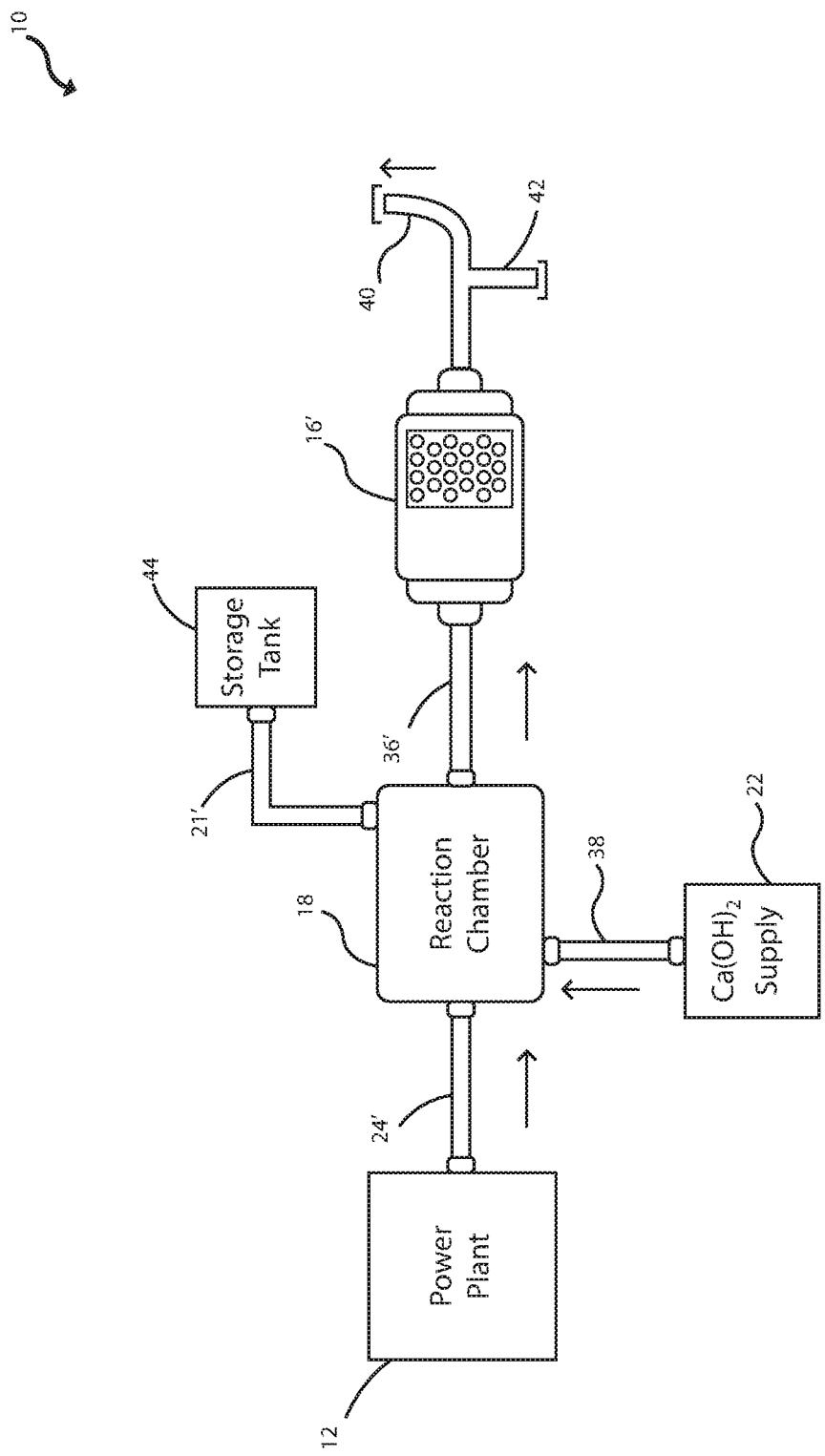
FIG. 3 is a partial flow chart and a partial diagrammatic representation of yet another embodiment of the subject design.

Referring to the embodiment of FIG. 3 as compared to FIG. 1, like elements have like element numbers and moved/modified elements has like element numbers with a 'prime' symbol attached thereto.

In the embodiment of FIG. 3, the wet scrubber 14 has been deleted and the catalytic converter 16 has been moved to a location downstream of the reaction chamber 18. The calcium carbonate (CaCO₃) and water being bypassed from the reaction chamber 18 in FIGS. 1 and 2 are being directed through the chemically produced compound line 21' to a storage tank 44. This calcium carbonate and water can be further processed as needed to extract calcium carbonate or to produce a gypsum product. The chemical reaction that was taking place in the wet scrubber 14 of FIGS. 1 and 2 is also taking place in the reaction chamber 18. Consequently, in most applications, the wet scrubber 14 is not needed. As previously noted with respect to FIG. 2, the catalytic converter 16' functions in the same manner as that described in FIG. 1 and FIG. 2.

Figure 4:
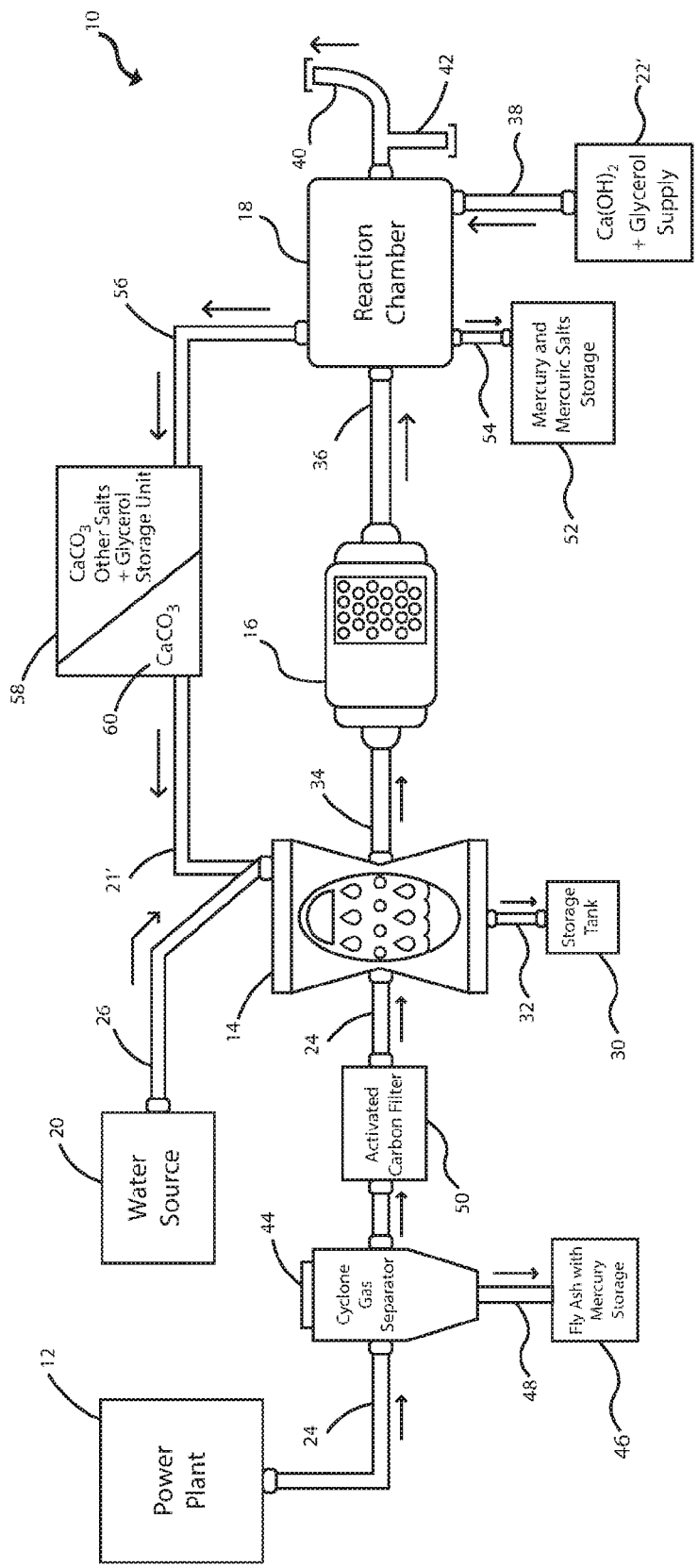
FIG. 4 is a partial flow chart and a partial diagrammatic representation of still another embodiment of the subject design.

Referring to the embodiment of FIG. 4 as compared to FIG. 1 like elements has like element numbers and modified elements will have a 'prime' symbol attached thereto.

In the embodiment of FIG. 4, the exhaust gas being emitted from the fossil-fuel fired power plant 12 further include 'fly ash', mercury, and mercuric salts. A cyclone gas separator 44 is added downstream from the fossil fuel-fired power plant 12 and is disposed in the exhaust gas connection line 24. A 'fly ash' with mercury storage 46 is connected to the bottom of the cyclone gas separator 44 by connection line 48. Within the cyclone gas separator 44, the surface of the 'fly ash' serves as an adsorbent for the vapors of the mercury and mercuric salts contained in the exhaust gas. At the high volumetric flowrates within the cyclone gas separator 44, the heavier 'fly ash', with any adsorbed mercury and mercuric salts attached, falls to the bottom where it can be collected in the fly ash with mercury storage 46 through connection line 48. The cyclone gas separator 44 is effective to remove most of the 'fly ash' from the exhaust gas.

Additionally, an activated carbon filter 50 is added downstream of the cyclone gas separator 44 and is also disposed in the exhaust gas connection line 24. The activated carbon filter 50 is operative to remove any remaining 'fly ash' and in cooperation with the cyclone gas separator 44 removes about 75 percent of the mercury and mercuric salts. The partially cleaned exhaust gases continue downstream to the wet scrubber 14 and the catalytic convertor to the reaction chamber 18 as previously set forth above in FIG. 1-3.

The calcium hydroxide supply ($Ca(OH)_2$) 22 of FIG. 1 is being modified in the subject embodiment of FIG. 4 and is labeled 22'. The calcium hydroxide storage 22 of FIG. 1 has a mixed portion of calcium hydroxide and a solubilizer. The solubilizer could be of various known solubilizers that are effective to enhance the solubility of the calcium hydroxide contained therein. Even though various solubilizers could be used herein, glycerol is the preferred solubilizer. Furthermore, mercury and mercuric salts storage 52 are added and connected to the reaction chamber 18 by a connection line 54.

Within the reaction chamber 18, the solution formed by the mixing of the calcium hydroxide and the glycerol is introduced into the reaction chamber 18 and interacts with the exhaust gases therein to remove all mercury and mercuric salts. As an example, the mixture of the glycerol and water is about 50 percent water and 50 percent glycerol and when mixed in a 190-liter (50 gallon) barrel and about 1.8 kilogram (4 pounds) of calcium hydroxide is added. It is recognized that the amounts of each element of the mixture could be varied without departing from the essence of the subject invention. Likewise, it is recognized that the volume of the described mixture could be linearly scaled up as the volume of exhaust gases increase. The removed mercury and mercuric salts are removed from the reaction chamber 18 through the connection line 54 to the mercury and mercuric storage 52.

During the removal of the mercury and mercuric salts from the exhaust gases, calcium carbonate and other salts are formed and amounts of glycerol are still present. The mixture of elements is discharges through connection line 56 to a Calcium Carbonate, other Salts, and Glycerol Storage Unit 58. Portions of the calcium carbonate is separated from the mixture of elements and stored in a separate compartment 60 thereof. Calcium carbonate is passed from the separate compartment 60 to the wet scrubber 14 through the compound connecting line 21'. The calcium carbonate is an important part of the chemical reaction taking place in the wet scrubber 14 as set forth with respect to FIG. 1.

As with respect to FIG. 1, the embodiments of FIGS. 2, 3 and 4, the cleaned exhaust gas may be safely emitted into the atmosphere through the exhaust line 40.

INDUSTRIAL APPLICABILITY

The subject processes set forth herein for exhaust gas clean-up provides a simple, safe, cost effective and an excellent process for removing various ones of the above noted detrimental compounds/elements from the exhaust of a fossil fuel fired power plant 12.

By directing the exhaust gas from the fossil fuel fired power plant 12 through any of the three embodiments presented herein, the detrimental compounds previously submitted are removed. With respect to FIG. 1, a wet scrubber 14 having a solution of water, calcium carbonate ($CaCO_3$), oxygen ($O_2$), and sulfur dioxide ($SO_2$) therein, the sulfur is chemically removed and the by-product of the gypsum slurry ($CaSO_4(2H_2O)$) is directed to a storage tank 30. During the reaction within the wet scrubber 14, the calcium carbonate ($CaCO_3$), water ($H_2O$), and oxygen ($O_2$) is consumed to convert the sulfur dioxide ($SO_2$) to the gypsum slurry ($CaSO_4(2H_2O)$). Even though the wet scrubber 14, is connected to the remote source of waster 20, the water being produced in the reaction chamber 18 and directed to the wet scrubber 14 through the source compound connection line 21 during the production of the calcium carbonate ($CACO_3$) is normally sufficient.

The chemically modified exhaust gas is passed through the catalytic converter 16 to provide chemical reaction like that of catalytic converters in automobiles. With the exception, the exhaust gases in fossil fuel fired power plants do not contain any appreciable amounts of carbon monoxide and is free of hydrocarbons. As previously stated, within the catalytic converter 16, the nitrogen oxides ($NO_2$) converts into nitrogen gas (N) and oxygen ($O_2$). The only things left at this point to treat is carbon dioxide ($CO_2$), nitrogen gas (N), water and oxygen. In order to reduce the carbon dioxide ($CO_2$) emissions as well as provide calcium carbonate ($CaCO_3$) for the wet scrubber, the exhaust gas is passed through the reaction chamber 18 that has calcium hydroxide ($Ca(OH)_2$ added therein. In the subject embodiment, the volume of calcium hydroxide ($Ca(OH)_2$ needed is approximately 962 g per 2380 L of incoming exhaust gas from the power plant 12. Within the reaction chamber 18, the chemical reaction of the calcium hydroxide ($Ca(OH)_2$ and carbon dioxide ($CO_2$), as set forth above, generates the calcium carbonate ($CaCO_3$) and water as needed in the wet scrubber 14. During this chemical reaction, the carbon dioxide ($CO_2$) level is eliminated or at least reduced to trace amounts. During the chemical reaction within the reaction chamber 18, for every 285.88 L of carbon dioxide ($CO_2$), it requires 953 g of calcium hydroxide ($Ca(OH)_2$. When the exhaust gas from the power plant 12 is low in sulfur, excess calcium carbonate ($CaCO_3$) is being generated in the reaction chamber 18. Consequently, if the exhaust gas from the power plant 12 is higher in sulfur, the extra sulfur can be readily removed due to the extra calcium carbonate ($CaCO_3$) being produced. This would not require extra calcium hydroxide ($Ca(OH)_2$ since the amount of carbon dioxide has not been changed. Furthermore, an additional volume of the by-product gypsum will be produced.

As previously noted with respect to FIGS. 2 and 3, the location of the catalytic converter 16 in the exhaust gas stream is not critical. The function of the catalytic converter 16 remains the same as it was in FIG. 1. The removal of the wet scrubber 14 does not inhibit the removal thereof in most applications since the same function is being performed in the reaction chamber 18. However, it is recognized that the wet scrubber 14 could be utilized as needed.

With respect to the embodiment of FIG. 4, if mercury and mercuric salts and/or large amounts of 'fly ash' are being emitted in large amounts from the fossil fuel-fired power plant 12, the cyclone gas separator 44 is effective to remove the vast majority of the 'fly ash' and collect the 'fly ash' in the 'fly ash' with mercury storage 46. Some of the mercury and mercury salts vapors contained in the exhaust gas are adsorbed on the surface of the 'fly ash' and removed with the trapped 'fly ash'. Any remaining 'fly ash' is trapped in the activated carbon filter 50 along with mercury and mercuric salts. The combination of the cyclone gas separator 44 and the activated carbon filter 50 effectively remove 75 percent of the mercury and mercuric salts contained in the exhaust gas.

The solution of calcium hydroxide and glycerol in the calcium hydroxide plus glycerol supply is introduced into the reaction chamber 18 and react with the exhaust gases being directed thereacross. Since the solubility of the calcium hydroxide has been enhanced with the introduction of glycerol, the mercury contained therein is substantially, fully converted to heavier mercuric salts and settles to the bottom of the reaction chamber 18 and stored in the mercury and mercuric salts storage 52 for future processing.

Other products of the chemical reaction within reaction chamber 18, such as calcium carbonate, other salts and glycerol, are passed to the Calcium Carbonate, Other Salts and Glycerol Storage Unit for storage and further processing. A portion of the calcium carbonate is separated from the mixture and stored in the separate compartment 60. The calcium carbonate is directed from the separate compartment 60 through the compound connection line 21' to the wet scrubber 14 to provide the needed calcium carbonate for the chemical reaction taking place in the wet scrubber 14 as previously set forth in FIGS. 1-3.

In conclusion, this process addresses the issues of nitrogen oxide ($NO_x$), sulfur oxide ($SO_2$). The process also addresses, in the reaction chamber 18, any carbon dioxide ($CO_2$) present or produced within the process. Nitrogen oxides ($NO_x$) are removed through the catalytic converter 16 and the removal is further enhanced by using platinum as a catalyst and generating nitrogen gas (N). The carbon dioxide ($CO_2$) is removed by reacting it with the calcium hydroxide ($Ca(OH)_2$) to produce the calcium carbonate ($CaCO_3$) that is used in the wet scrubber 14, if provided, or stored in the storage tank 44.

Other embodiments as well as certain variations and modifications of the embodiment herein shown and described will obviously occur to those skilled in the art upon becoming familiar with the underlying concept. It is to be understood, therefore, that the subject design, as claimed, may be practiced otherwise than as specifically set forth above.

What is claimed is:

1. A method for removing fly ash, mercury, and mercuric salts from exhaust gas being emitted from a fossil fuel fired power plant, consisting of:
   connecting the exhaust gas from the fossil fuel-fired power plant to an inlet of a cyclone gas separator, wherein the cyclone gas separator effectively separates and stores the heavier fly ash;
   connecting the lighter exhaust gas from the cyclone separator with the inlet of an activated carbon filter and trapping additional fly ash therein along with the mercury and mercuric salts;
   directing the exhaust gas from the activated carbon filter to a reaction chamber operative to remove substantially all of the remaining mercury and mercuric salts from the exhaust gas; and
   mixing the exhaust gas in the reaction chamber with a soluble slurry of calcium hydroxide and water enhanced by a solubilizing agent and chemically producing heavier mercuric salts from the mercury in the exhaust gas and the heavier mercuric salts are removed from the reaction chamber and stored.

2. The method as set forth in claim 1 wherein the solubilizing agent is glycerol.

3. The method of claim 2 wherein the mixture of the enhance soluble solution is about 50 percent water, about 50 percent glycerol, and about 1.8 kilograms of calcium hydroxide added per 190-liter barrel.

4. The method of claim 3 including a wet scrubber connected to a source of calcium carbonate and water and disposed between the activated carbon filter and the reaction chamber, wherein the chemical reaction of the calcium carbonate and water with the exhaust gas therein remove sulfur contained in the exhaust gas.

5. The method of claim 4 wherein a by-product of gypsum is produced during the chemical removal of the sulfur from the exhaust gas.

6. The method of claim 5 including a catalytic converter disposed downstream of the wet scrubber and operative to remove nitrogen oxides and trace amounts of carbon monoxide from the exhaust gas.

7. The method of claim 6 wherein the catalytic converter is a platinum converter with an internal platinum honeycomb arrangement.

8. The method of claim 7 wherein the fossil fuel is coal.

* * * * *